(12) United States Patent
Cigal et al.

(10) Patent No.: US 10,648,553 B2
(45) Date of Patent: May 12, 2020

(54) OIL SCRAPER

(71) Applicant: United Technologies Corporation, Farmington, CT (US)

(72) Inventors: Brian P. Cigal, Windsor, CT (US); Christopher T. Anglin, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 387 days.

(21) Appl. No.: 15/609,066

(22) Filed: May 31, 2017

(65) Prior Publication Data
US 2018/0347684 A1 Dec. 6, 2018

(51) Int. Cl.
*F16H 57/04* (2010.01)
*F02C 7/36* (2006.01)
*F16H 1/12* (2006.01)

(52) U.S. Cl.
CPC ............ *F16H 57/0423* (2013.01); *F02C 7/36* (2013.01); *F16H 1/12* (2013.01); *F16H 57/04* (2013.01); *F16H 57/0402* (2013.01); *F16H 57/0409* (2013.01); *F16H 57/0491* (2013.01); *F16H 57/0495* (2013.01)

(58) Field of Classification Search
CPC ............. F16H 57/0491; F16H 57/0423; F16H 57/0402; F16H 57/0409; F16H 1/12; F16H 57/04; F16H 57/0495; F02C 7/36
See application file for complete search history.

(56) References Cited

U.S. PATENT DOCUMENTS

| | | | |
|---|---|---|---|
| 5,813,493 A * | 9/1998 | Sloan | F01M 13/0011 184/106 |
| 6,110,386 A | 8/2000 | Underhill | |
| 8,517,147 B2 * | 8/2013 | Imai | F16H 57/0493 184/6.12 |
| 8,833,193 B2 | 9/2014 | Strau.beta. et al. | |
| 9,062,754 B2 | 6/2015 | Strau.beta. et al. | |
| 9,127,760 B1 | 9/2015 | Potter et al. | |
| 10,197,150 B2 * | 2/2019 | Anglin | F02C 7/32 |

(Continued)

FOREIGN PATENT DOCUMENTS

EP 2762737 B1 1/2017

OTHER PUBLICATIONS

European Search Report dated Dec. 3, 2018 for EP Application No. 18173676.
EP search report for EP18173676.0 dated Aug. 31, 2018.

*Primary Examiner* — Jeremy R Severson
(74) *Attorney, Agent, or Firm* — Getz Balich LLC

(57) ABSTRACT

A gear assembly is provided. The gear assembly includes a first gear that rotates about a first axis and includes a first gear face with a plurality of first gear teeth; a second gear that rotates about a second axis and includes a second gear face with a plurality of second gear teeth, where the first axis is not parallel with the second axis and the first and second teeth rotatably engage as the first gear rotates about the first axis and the second gear rotates about the second axis; a scraper that includes a distal interference surface in face-to-face proximity with at least one of the first plurality of teeth as the first gear rotates about the first axis, where the interference surface removes oil entrained adjacent to the plurality of first or second gear teeth as the first or second gears rotate.

18 Claims, 4 Drawing Sheets

(56) References Cited

U.S. PATENT DOCUMENTS

| | | |
|---|---|---|
| 10,221,937 B2 * | 3/2019 | Anglin ................ F16H 57/0423 |
| 2010/0144480 A1 | 6/2010 | Downs et al. |
| 2012/0238396 A1 | 9/2012 | Weber et al. |
| 2015/0097073 A1 | 4/2015 | McPeak et al. |
| 2015/0298544 A1 | 10/2015 | Amerla et al. |
| 2016/0131243 A1 * | 5/2016 | Fomison ............. F16H 57/0409 |
| | | 74/423 |

* cited by examiner

OIL SCRAPER

BACKGROUND OF THE INVENTION

1. Technical Field

The present disclosure relates generally to oil scrapers for use in rotating machinery. More particularly, the disclosure relates to an oil scraper for use in a gas turbine engine.

2. Background Information

During operation of a gas turbine engine with a gear assembly, oil adheres to the rotating gears in response to windage and churning. For example, as the gears rotate, oil adheres to the rotating assembly or the oil may become entrained in the windage cloud surrounding the high speed rotating gear. Oil particles are drawn into and entrained about the gear as a result of the high rotary speed, rather than being expelled out of the windage in response to the centrifugal force. The entrained oil decreases the efficiency of the rotating gear assembly because the rotating mass increases and creates drag. The use of a shroud over at least one of the gears may further decrease efficiency.

It would be desirable to improve oil management about rotating gears, including shrouded rotating gears.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gear assembly having a first gear that rotates about a first axis and includes a first gear face with a plurality of first gear teeth. The gear assembly may comprise a second gear that rotates about a second axis and includes a second gear face with a plurality of second gear teeth, where the first axis is not parallel with the second axis and the first and second teeth rotatably engage as the first gear rotates about the first axis and the second gear rotates about the second axis. The gear assembly may further comprise a scraper that includes a distal interference surface in face-to-face proximity with at least one of the first plurality of teeth as the first gear rotates about the first axis, where the interference surface removes oil entrained adjacent to the plurality of first or second gear teeth as the first or second gears rotate.

The interference surface may be non-contacting with respect to the plurality of first gear teeth.

The interface surface may cause a disruption to air pressure about the rotating first plurality of teeth to disrupt forces entraining oil with respect to the first plurality of teeth to reduce the amount of entrained oil.

The shape of the interference surface may complement shape of the plurality of first gear teeth.

The gear assembly may further comprise a second scraper that includes a second distal interference surface in face-to-face proximity with at least one of the first plurality of teeth, where the second interference surface removes oil entrained adjacent to the plurality of first gear teeth as the first gear rotates.

According to another aspect of the present disclosure, a gear assembly is provided. The gear assembly may comprise a first gear that rotates about a first axis and includes a first gear face with a plurality of first gear teeth. The gear assembly may further comprise a second gear that rotates about a second axis and includes a second gear face with a plurality of second gear teeth. The first axis is not parallel with the second axis and the first and second teeth rotatably engage as the first gear rotates about the first axis and the second gear rotates about the second axis. The gear assembly may comprise a shroud coaxially located over the plurality of first teeth. The shroud includes a base surface and a circumferential sidewall extending from the base surface and a first cutout in the sidewall for the first gear teeth and the second gear teeth to rotatably engage. The shroud also includes a second cutout in the sidewall with a radially inward extending interference surface in face-to-face proximity with at least of a portion of the plurality of first gear teeth, where the interference surface removes oil entrained adjacent to the plurality of first gear teeth as the first gear rotates.

The shroud and the radially inward extending interference surface may be unitary components.

The shroud and the radially inward extending interference surface may be unitary and formed from sheet metal.

The shroud and the radially inward extending interference surface may be cast.

The interference surface may be non-contacting with respect to the plurality of first gear teeth.

The interface surface may cause a disruption to air pressure about the rotating first plurality of teeth to disrupt forces entraining oil with respect to the first plurality of teeth to reduce the amount of entrained oil.

The gear assembly may further comprise a third cutout in the sidewall with a third radially inward extending interference surface in face-to-face proximity with at least of a portion of the first plurality of teeth, where the third radially inward interference surface removes oil entrained adjacent to the plurality of first gear teeth as the first gear rotates.

According to another aspect of the present disclosure, a gas turbine engine gear assembly is provided. The gas turbine engine gear assembly may comprise a first gear that rotates about a first axis and includes a first gear face with a plurality of first gear teeth. The gas turbine engine gear assembly may further comprise a second gear that rotates about a second axis and includes a second gear face with a plurality of second gear teeth. The first axis is not parallel with the second axis and the first and second teeth rotatably engage as the first gear rotates about the first axis and the second gear rotates about the second axis. The gas turbine engine gear assembly may comprise a shroud coaxially located over the plurality of first teeth. The shroud includes a base surface and a circumferential sidewall extending from the base surface, a first cutout in the sidewall for the first gear teeth and the second gear teeth to rotatably engage. The shroud also includes a second cutout in the sidewall with a radially inward extending interference surface in face-to-face non-contacting proximity with at least of a portion of the first plurality of teeth, where the interference surface removes oil entrained adjacent to the plurality of first gear teeth as the first gear rotates, and the shroud and interference surface are of unitary construction.

The shroud and the radially inward extending interference surface may be cast.

The shroud and the radially inward extending interference surface may be formed from sheet metal.

The interface surface may cause a disruption to air pressure about the rotating first plurality of teeth to disrupt forces entraining oil with respect to the first plurality of teeth to reduce the amount of entrained oil. The shape of the interference surface may compliment shape of the plurality of first gear teeth.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
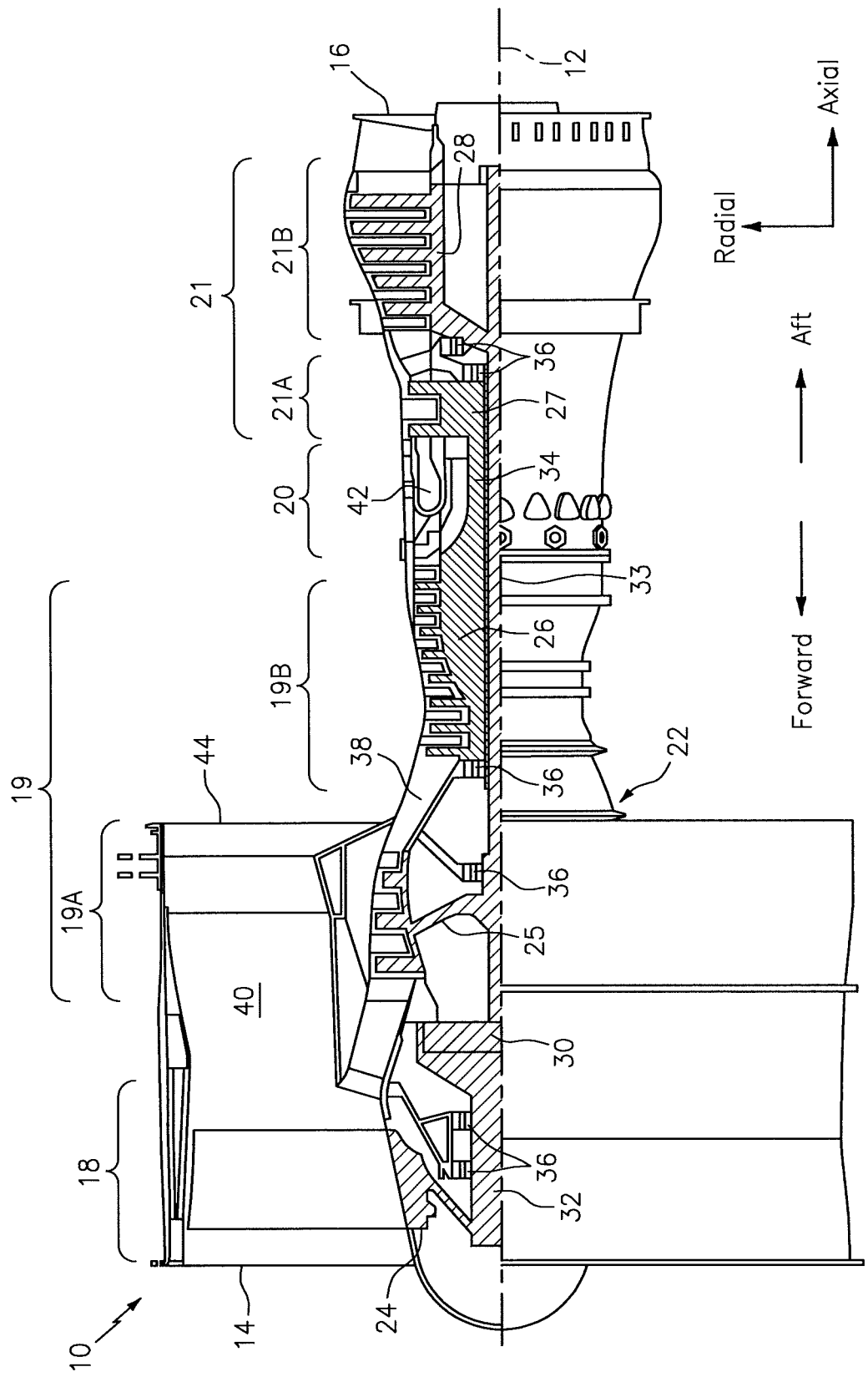
FIG. 1 is a side cutaway illustration of a geared turbine engine.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 2:
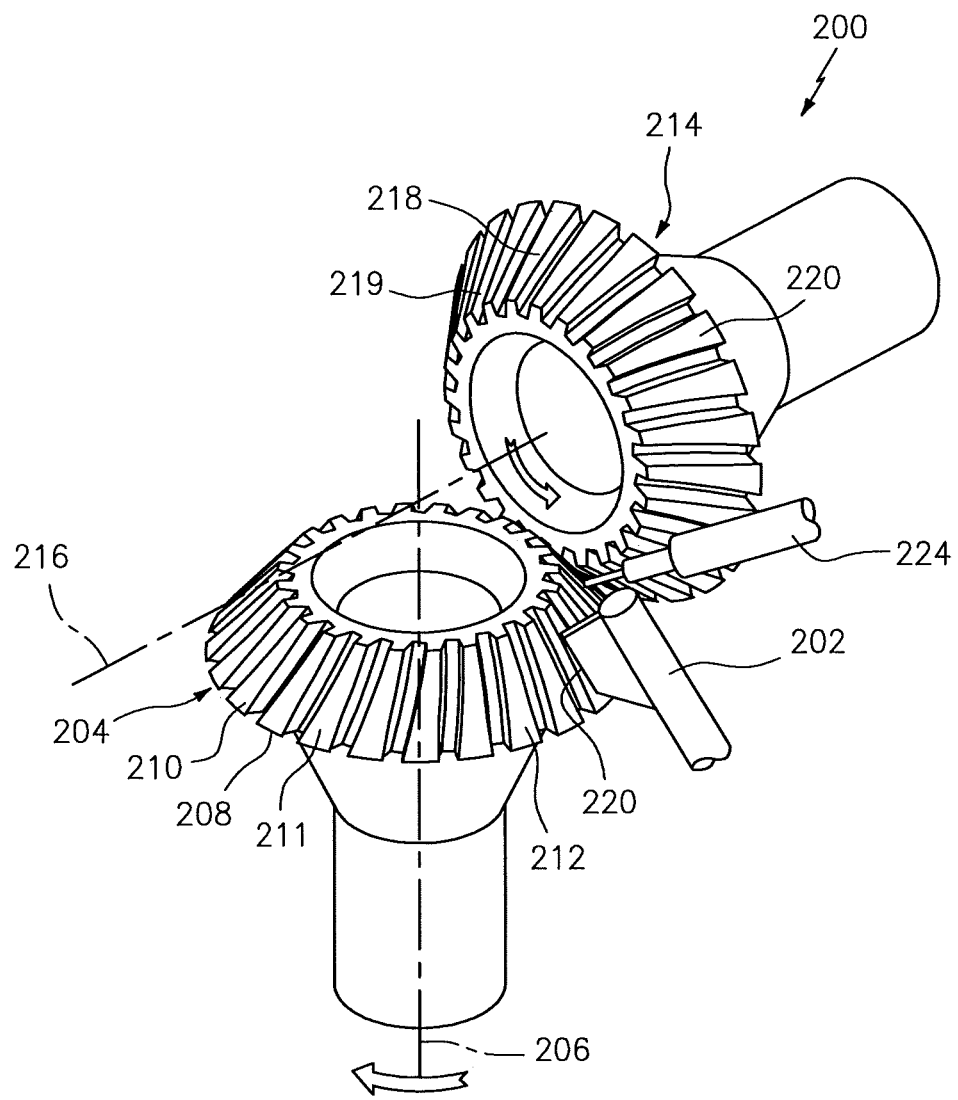
FIG. 2 is a simplified illustration of a spiral bevel gear assembly that includes an oil scraper.

FIG. 2 is a simplified illustration of a gear assembly 200 (e.g., a spiral beveled gear assembly) that includes an oil scraper 202. The assembly comprises a first gear 204 that rotates about a first axis 206 and includes a first gear face (e.g., beveled) 208 with a plurality of first gear teeth, e.g., 210-212 (e.g., spiral). A second gear 214 rotates about a second axis 216 and includes a second gear face (e.g., beveled) with a plurality of second gear teeth 218-220 (e.g., spiral), where the first axis 206 is not parallel with the second axis 216. The first and second teeth rotatably engage as the first gear 204 rotates about the first axis 206 and the second gear 214 rotates about the second axis 216.

The scraper 202 includes a distal interference surface 220 that is in face-to-face non-contacting proximity with the plurality of first gear teeth, e.g., 210-212 as the first gear 204 rotates. The interference surface 220 may be at an angle with respect to the first axis 206, where the angle is generally consistent with the angle of the first gear face 208, such that the interference surface 220 is positioned in non-contacting face-to-face proximity to a passing first gear tooth. The interference surface 220 does not physically contact the rotating teeth 210-212, but instead relies on disruption to the air flow created by the rotating teeth being in close proximity of the interference surface 220. The interference surface shall be as close as practically possible to the rotating teeth without touching, including consideration of tolerances, thermal growth and deflections. It is contemplated that the interference surface may include, for example, bumps, protrusions, grooves, etc. to create more of a disruption to the forces that may be entraining the oil. At high RPMs the interference surface 220 interferes with a pressure differential that draws oil into a windage cloud, reducing the amount of entrained oil.

The shape of the interference surface 220 may be selected to compliment (e.g., match) the shape of the first gear teeth faces.

The scraper 202 may be a separate component (e.g., metallic) mounted to a rigid non-rotating structure of a gas turbine engine. The scraper 202 should be located a sufficient distance from an oil nozzle 224 that delivers oil to the first gear face 208 to lubricate and cool. Alternatively, the scraper 202 may be cooperatively located to remove entrained oil of the second gear wheel 214. It is contemplated that the scraper may be on either gear, or both, depending upon the nature of windage and entrainment experienced by any particular gearset.

Figure 3:
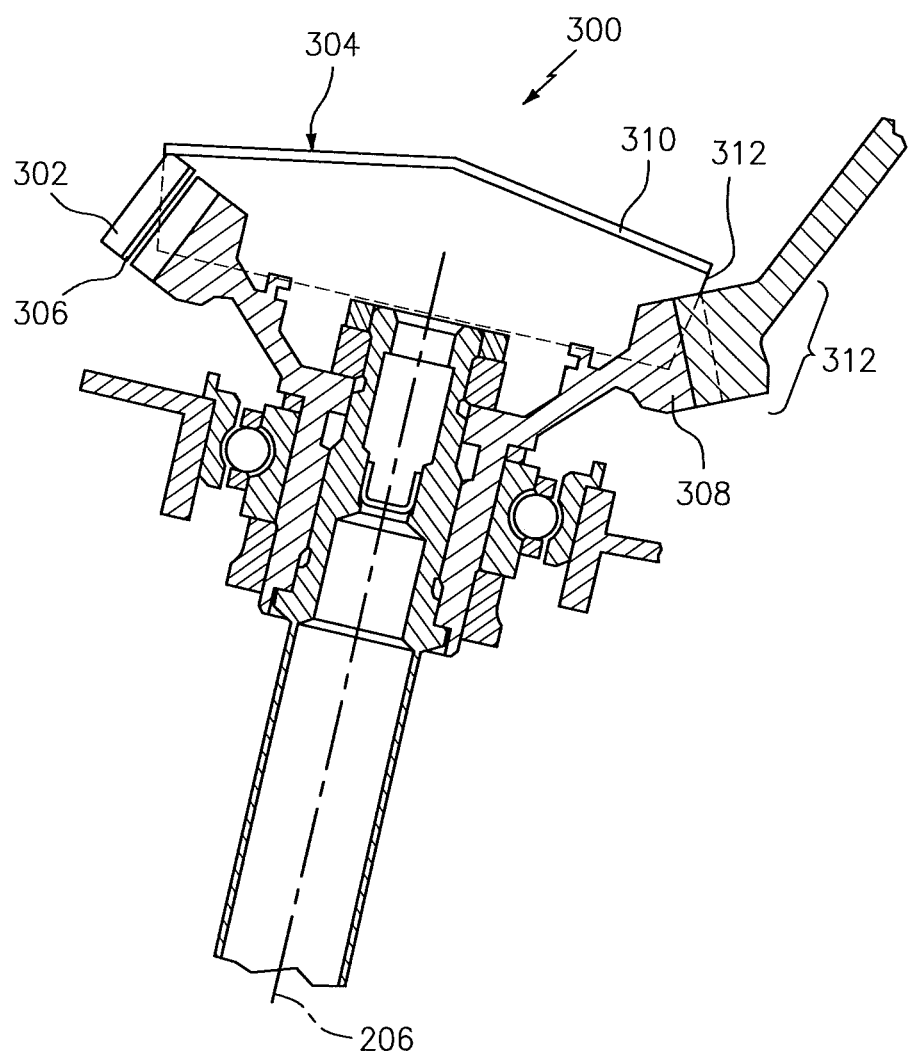
FIG. 3 is a cross sectional illustration of a shrouded gear assembly with an oil scraper integral with a shroud.

FIG. 3 is a cross sectional illustration of a shrouded gear assembly 300 with an oil scraper 302 that includes an interference surface 306 integral with a shroud 304. The stationary non-contacting interference surface 306 disrupts air pressure adjacent to the rotating teeth of a gear wheel 308 passing in close face-to-face proximity to the interference surface 306. This reduces attractive forces causing oil to be entrained by the rotating gear wheel 308, thus reducing the amount of entrained oil.

The shroud 304 may be coaxially located over the gear wheel 308, where the shroud includes a base surface 310 and a circumferential sidewall 312 extending from the base surface 310. A first cutout 312 is located in the sidewall 310 for the first gear teeth and the second gear teeth to rotatably engage. A second cutout may be located in the sidewall with the radially inward extending interference surface 306 operatively positioned in non-contacting face-to-face proximity with teeth of the gear wheel, so the interference surface 306 removes oil entrained adjacent to the plurality of first gear teeth as the first gear rotates.

Figure 4:
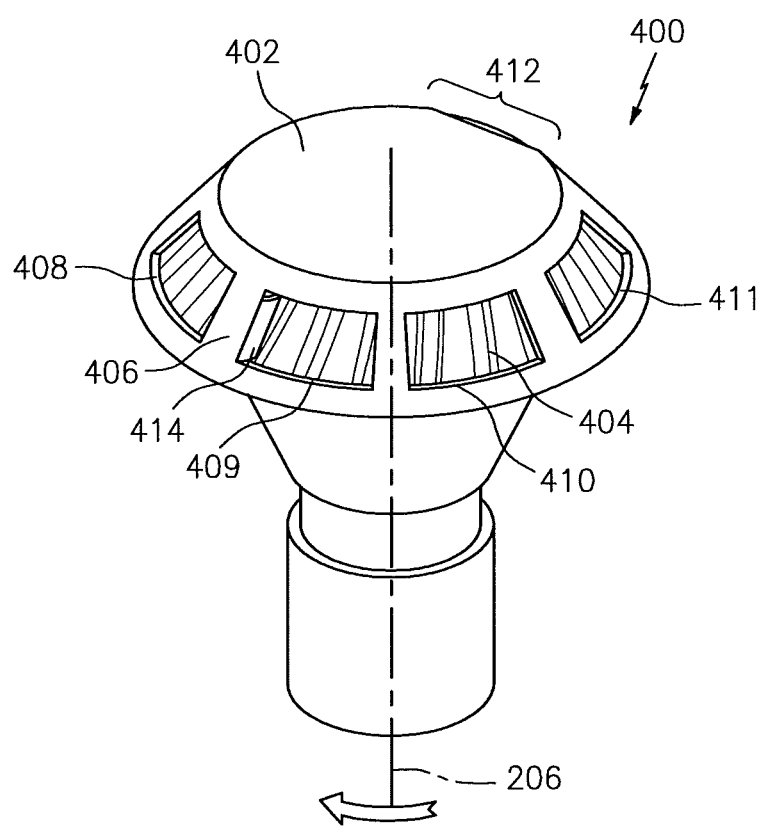
FIG. 4 is a pictorial illustration of a shrouded gear wheel that includes a plurality of cutouts in a sidewall of the shroud, where at least one of the cutouts has an associated oil scraper.

FIG. 4 is a pictorial illustration of a shrouded gear assembly 400 that includes a shroud 402 and a gear wheel 404. The shroud includes a sidewall 406 that comprises a plurality of cutouts 408-412, where at least one of the cutouts such as cutout 409 includes an associated oil scraper 414. In this embodiment the oil scraper 414 may be of unitary construction with the sidewall 406, and extends generally radially inward such that the oil scraper disrupts, in a non-contacting manner, forces entraining oil around the rotating gear teeth. The cutout 412 provides the cut out for gear mesh with second gear wheel (not shown).

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A gear assembly, comprising:
  a first gear that rotates about a first axis and includes a first gear face with a plurality of first gear teeth, each of the plurality of first gear teeth having a radially outer surface forming a portion of the first gear face;
  a second gear that rotates about a second axis and includes a second gear face with a plurality of second gear teeth, where the first axis is not parallel with the second axis and the first and second teeth rotatably engage as the first gear rotates about the first axis and the second gear rotates about the second axis; and
  a scraper that includes a distal interference surface in face-to-face proximity with the radially outer surface of at least one of the first plurality of teeth as the first gear rotates about the first axis, where the distal interference surface removes oil entrained adjacent to the plurality of first or second gear teeth as the first or second gears rotate, where the distal interference surface causes a disruption to air pressure about the rotating first plurality of teeth to disrupt forces entraining oil with respect to the first plurality of teeth to reduce the amount of entrained oil.

2. The gear assembly of claim 1, wherein the distal interference surface is non-contacting with respect to the plurality of first gear teeth.

3. The gear assembly of claim 1, wherein shape of the distal interference surface complements shape of the plurality of first gear teeth.

4. The gear assembly of claim 1, further comprising a second scraper that includes a second distal interference surface in face-to-face proximity with at least one of the first plurality of teeth, where the second interference surface removes oil entrained adjacent to the plurality of first gear teeth as the first gear rotates.

5. The gear assembly of claim 1, wherein the distal interference surface has a first length corresponding in direction to a second length of the radially outer surface of the at least one of the first plurality of teeth in face-to-face non-contacting proximity with the distal interference surface.

6. A gear assembly, comprising:
  a first gear that rotates about a first axis and includes a first gear face with a plurality of first gear teeth, each of the plurality of first gear teeth having a radially outer surface forming a portion of the first gear face;
  a second gear that rotates about a second axis and includes a second gear face with a plurality of second gear teeth, where the first axis is not parallel with the second axis and the first and second teeth rotatably engage as the first gear rotates about the first axis and the second gear rotates about the second axis; and
  a shroud coaxially located over the plurality of first teeth, where the shroud includes a base surface and a circumferential sidewall extending from the base surface and a first cutout in the sidewall for the first gear teeth and the second gear teeth to rotatably engage and a second cutout in the sidewall with a radially inward extending interference surface in face-to-face proximity with the radially outer surface of at least of a portion of the plurality of first gear teeth, where the radially inward extending interference surface removes oil entrained adjacent to the plurality of first gear teeth as the first gear rotates, and where the radially inward extending interference surface causes a disruption to air pressure about the rotating first plurality of teeth to disrupt forces entraining oil with respect to the first plurality of teeth to reduce the amount of entrained oil.

7. The gear assembly of claim 6, where the shroud and the radially inward extending interference surface are unitary components.

8. The gear assembly of claim 7, a third cutout in the sidewall with a third radially inward extending interference surface in face-to-face proximity with at least of a portion of the first plurality of teeth, where the third radially inward interference surface removes oil entrained adjacent to the plurality of first gear teeth as the first gear rotates.

9. The gear assembly of claim 6, where the shroud and the radially inward extending interference surface are unitary and formed from sheet metal.

10. The gear assembly of claim 6, where the shroud and the radially inward extending interference surface are cast.

11. The gear assembly of claim 6, wherein the radially inward extending interference surface is non-contacting with respect to the plurality of first gear teeth.

12. The gear assembly of claim 6, wherein the radially inward extending interference surface has a first length corresponding in direction to a second length of the radially outer surface of the at least one of the first plurality of teeth in face-to-face non-contacting proximity with the radially inward extending interference surface.

13. A gas turbine engine gear assembly, comprising:
a first gear that rotates about a first axis and includes a first gear face with a plurality of first gear teeth, each of the plurality of first gear teeth having a radially outer surface forming a portion of the first gear face;
a second gear that rotates about a second axis and includes a second gear face with a plurality of second gear teeth, where the first axis is not parallel with the second axis and the first and second teeth rotatably engage as the first gear rotates about the first axis and the second gear rotates about the second axis;
a shroud coaxially located over the plurality of first teeth, where the shroud includes a base surface and a circumferential sidewall extending from the base surface, a first cutout in the sidewall for the first gear teeth and the second gear teeth to rotatably engage, and a second cutout in the sidewall with a radially inward extending interference surface in face-to-face non-contacting proximity with the radially outer surface of at least of a portion of the first plurality of teeth, where the radially inward extending interference surface removes oil entrained adjacent to the plurality of first gear teeth as the first gear rotates, and the shroud and radially inward extending interference surface are of unitary construction, and where the radially inward extending interference surface causes a disruption to air pressure about the rotating first plurality of teeth to disrupt forces entraining oil with respect to the first plurality of teeth to reduce the amount of entrained oil.

14. The gas turbine engine gear assembly of claim 13, where the shroud and the radially inward extending interference surface are cast.

15. The gas turbine engine gear assembly of claim 13, where the shroud and the radially inward extending interference surface are formed from sheet metal.

16. The gear assembly of claim 13, where the radially inward extending interference surface causes a disruption to air pressure about the rotating first plurality of teeth to disrupt forces entraining oil with respect to the first plurality of teeth to reduce the amount of entrained oil.

17. The gear assembly of claim 16, wherein a shape of the radially inward extending interference surface compliments a shape of the plurality of first gear teeth.

18. The gear assembly of claim 13, wherein the radially inward extending interference surface has a first length corresponding in direction to a second length of the radially outer surface of the at least one of the first plurality of teeth in face-to-face non-contacting proximity with the radially inward extending interference surface.

* * * * *